United States Patent
Blackmon et al.

(10) Patent No.: US 8,132,048 B2
(45) Date of Patent: Mar. 6, 2012

(54) SYSTEMS AND METHODS TO EFFICIENTLY SCHEDULE COMMANDS AT A MEMORY CONTROLLER

(75) Inventors: H. Lee Blackmon, Moline, IL (US); Ryan S. Haraden, Rochester, MN (US); Joseph A. Kirscht, Rochester, MN (US); Elizabeth A. McGlone, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 12/545,192

(22) Filed: Aug. 21, 2009

(65) Prior Publication Data

US 2011/0047400 A1 Feb. 24, 2011

(51) Int. Cl.
*G06F 11/00* (2006.01)
(52) U.S. Cl. .............................. 714/18; 714/43; 711/149
(58) Field of Classification Search .................... 714/42, 714/6.1, 6.11, 6.12, 16, 18, 43, 748, 56; 711/149
See application file for complete search history.

(56) References Cited

U.S. PATENT DOCUMENTS

| | | | |
|---|---|---|---|
| 5,210,867 | A | 5/1993 | Barlow et al. |
| 7,024,591 | B2 * | 4/2006 | Moody et al. .................... 714/43 |
| 7,328,315 | B2 * | 2/2008 | Hillier et al. ................... 711/149 |
| 2003/0163769 | A1 * | 8/2003 | Phelps ............................ 714/43 |
| 2007/0022245 | A1 | 1/2007 | Sohn et al. |
| 2007/0089035 | A1 * | 4/2007 | Alexander et al. ............. 714/766 |
| 2010/0205383 | A1 * | 8/2010 | Blackmon et al. ............. 711/149 |

* cited by examiner

*Primary Examiner* — Robert Beausoliel, Jr.
*Assistant Examiner* — Joseph Kudirka
(74) *Attorney, Agent, or Firm* — Toler Law Group

(57) ABSTRACT

Systems and methods to respond to schedule commands at a memory controller are disclosed. A transmission error between a first memory controller port and a first redrive device may be detected. A first corrective action may be initiated at the first memory controller port in response to the detection of the transmission error. A particular method may include determining that a second memory controller port initiated a second corrective action. Incoming read commands may be distributed based on a comparison of the first corrective action and the second corrective action.

20 Claims, 12 Drawing Sheets

US 8,132,048 B2

SYSTEMS AND METHODS TO EFFICIENTLY SCHEDULE COMMANDS AT A MEMORY CONTROLLER

I. FIELD OF THE INVENTION

The present invention relates generally to data communication, and more specifically, to reducing data transmission errors.

II. BACKGROUND

Data transmissions can be significantly affected by errors in the transmission. For example, transmission errors may affect a read command sent from a memory controller to a memory redrive device. In response to a detected error, the memory redrive device may transmit a special error indication command alert status frame. The alert status frame indicates that the read command was corrupted. The memory controller may subsequently perform a corrective action, such as resending the failed command. For instance, the memory controller may replay the read command or retrain the link between the memory controller and the memory redrive device prior to replaying the read command.

When a memory controller is engaged in a corrective action, its ability to process new commands and data is diminished. For example, the memory controller may be unavailable to transmit commands from a requesting agent or to receive data related to the commands. Commands assigned to a memory controller may become backlogged in the memory controller. Such a backlog may increase memory latency. In many instances, memory latency may result in an undesirable decrease in overall system performance. Therefore, there exists a need for improved command scheduling at the memory controller.

III. SUMMARY OF THE DISCLOSURE

In a particular embodiment, an improved method of scheduling commands at a memory controller is disclosed. The method includes detecting a transmission error between a first memory controller port and a first redrive device. A first corrective action is initiated at the first memory controller port in response to the detection of the transmission error. The method further includes determining that a second memory controller port initiated a second corrective action. Incoming read commands are distributed based on a comparison of the first corrective action and the second corrective action.

In another particular embodiment, an improved method of scheduling commands at a memory controller is disclosed. The method includes determining that a link between a memory controller and a redrive device requires the synchronization command to be transmitted from the memory controller to the redrive device. An undesirable half of a core clock cycle may be determined based on a round-trip time of a signal. The method further includes scheduling transmission of the synchronization command based on the determination of the undesirable half of the core clock cycle.

In another particular embodiment, an improved method to schedule commands at a memory controller is disclosed. The method includes receiving from a memory controller port an indication of a number of queued commands in a read queue of the memory controller port during a cycle. A number of sent commands transmitted to the memory controller port may be tracked. The method further includes determining a predicted number of queued commands in the read queue during a subsequent cycle based on the number of queued commands and the number of sent commands.

These and other advantages and features that characterize the invention are set forth in the claims annexed hereto and forming a further part hereof. However, for a better understanding of the invention, and of the advantages and objectives attained through its use, reference should be made to the drawings and to the accompanying descriptive matter in which there are described exemplary embodiments of the invention.

IV. BRIEF DESCRIPTION OF THE DRAWINGS

V. DETAILED DESCRIPTION

Figure 1:
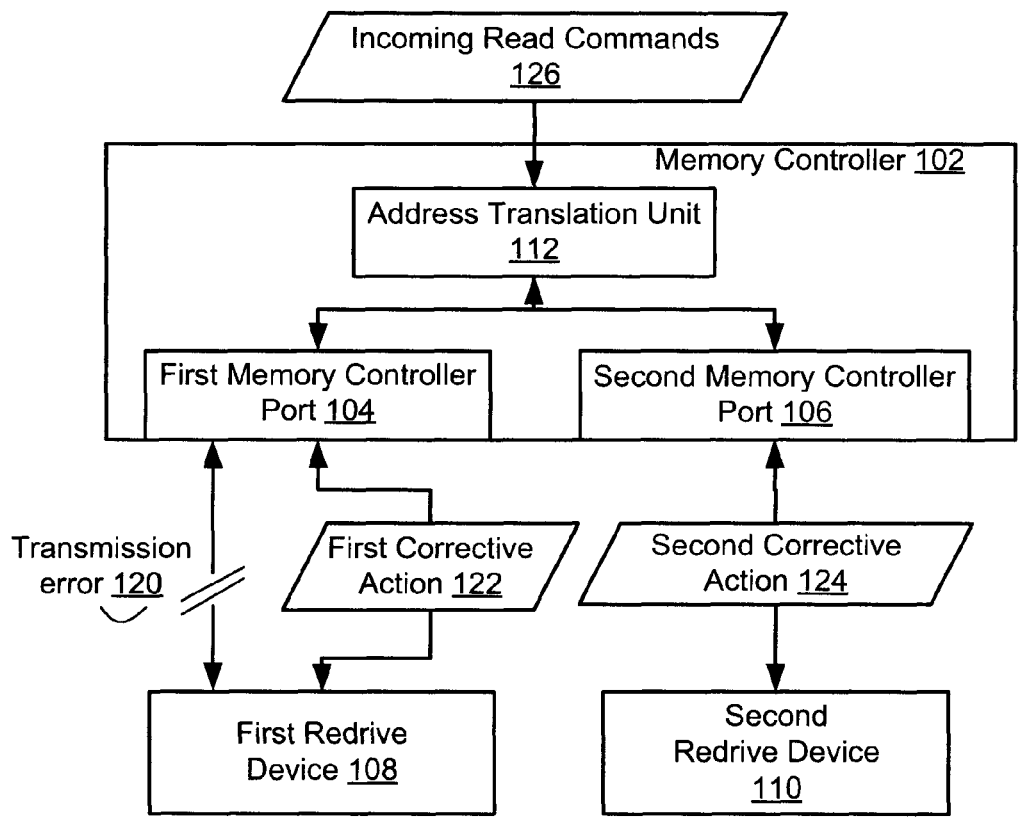
FIG. 1 is a block diagram of a first embodiment of a system to schedule commands at a memory controller.

FIG. 1 is a diagram of a first embodiment of a system configured to schedule commands at a memory controller and is generally designated 100. The system 100 includes a first redrive device 108, a second redrive device 110, and a memory controller 102. The memory controller 102 includes an address translation unit 112, a first memory controller port 104, and a second memory controller port 106. In a particular embodiment, the first memory controller port 104 and the first redrive device 108 are connected via a first high speed link. The second memory controller port 106 and the second redrive device 110 may be connected via a second high speed link. Each high speed link may refer to two unidirectional high speed links. For instance, the first memory controller port 104 may transmit to the first redrive device 108 via a southbound link of the first high speed link. The first redrive device 108 may transmit to the first memory controller port 104 via a northbound link of the first high speed link.

In a particular embodiment, the first memory controller port 104 and the second memory controller port 106 access different redrive devices that contain identical memory contents. For example, the first memory controller port 104 and the second memory controller port 106 may be mirrored. Data accessed by the first memory controller port 104 and the second memory controller port 106 may be identical.

The memory controller 102 may compare a first corrective action 122 initiated at the first memory controller port 104 and a second corrective action 124 initiated at the second memory controller port 106. Comparing the corrective actions may include determining a severity of the corrective actions and a sequence in which the corrective actions were initiated. Based on the comparison, the memory controller 102 may determine which of the memory controller ports will be available first for processing incoming read commands 126. Scheduling the incoming read commands 126 to be performed by the memory controller 102 port that is first available may reduce delay caused by the incoming read commands 126. Such incoming read commands 126 may become backlogged at a memory controller port engaged in a corrective action. Minimizing delay at the memory controller ports improves memory latency and increases the overall efficiency of the system 100.

The memory controller 102 may be configured to detect a transmission error between the first memory controller port 104 and the first redrive device 108. The memory controller 102 may be further configured to initiate the first corrective action 122 at the first memory controller port 104 in response to the detection of the transmission error 120. The memory controller 102 may determine that the second memory controller port 106 initiated the second corrective action 124. The memory controller 102 may distribute the incoming read commands 126 based on the comparison of the first corrective action 122 and the second corrective action 124.

The first memory controller port 104 may transmit a stream of commands to the first redrive device 108 via the southbound link of the first high speed link. The first redrive device 108 may decode and reformat the stream of commands to send to a memory structure (not illustrated) connected to the first redrive device 108. The memory structure may retrieve data in response to the command stream and may transmit the data to the first redrive device 108. The first redrive device 108 may reformat the data received from the memory structure and transmit the reformatted data to the first memory controller port 104 via the northbound link of the high speed link.

The first redrive device 108 may detect a transmission error in the command stream received via the southbound link of the first high speed link. For example, the first redrive device 108 may determine that a first command within the command stream contains an uncorrectable error-correcting code (ECC) or a cyclic redundancy check (CRC) error. After detecting the transmission error 120, the first redrive device 108 may drop all subsequent commands in the command stream and return an alert status frame to the first memory controller port 104. The first redrive device 108 may return a stream of alert status frames to the first memory controller port 104 via the northbound link of the first high speed link in response to the transmission error 120. The first memory controller port 104 may use the received alert status frames to detect the transmission error 120 between the first memory controller port 104 and the first redrive device 108. For instance, the first memory controller port 104 may determine that the transmission error 120 occurred in the southbound link of the first high speed link based on the receipt of the alert status frame via the northbound link of the first high speed link.

The first memory controller port 104 may detect the transmission error 120 in the data received from the first redrive device 108 via the northbound link of the first high speed link. For example, the first memory controller port 104 may include logic that checks the data received from the first redrive device 108 for CRC errors. For instance, the CRC checking may indicate that the data received from the first redrive device 108 contains a transmission error (e.g., the transmission error 120).

In response to the detection of the transmission error 120, the memory controller 102 may initiate the first corrective action 122 at the first memory controller port 104. The first corrective action 122 may be a replay action. The replay action may be selected as the first corrective action 122 in instances where the first high speed link is ready for reissuance of the command stream. For example, after receiving the alert status frame, the first memory controller port 104 may issue a link error status reset of the first high speed link. Alternatively, the link error status reset may be referred to as a soft reset. If the soft reset is successful in clearing the first high speed link of the alert status frames, then the first high speed link may be ready for reissuance of the command stream. The first memory controller port 104 may initiate the replay action as the first corrective action 122. For instance, the first redrive device 108 may detect the transmission error 120 in the first command of the command stream received via the southbound link of the first high speed link.

In response to detecting the transmission error 120, the first redrive device 108 may drop all subsequent commands in the command stream that were received after the first command. The first redrive device 108 may not redrive the first command or the subsequent commands to the memory structure. The replay action may be used to reissue the command stream to the first redrive to allow the first redrive device 108 to redrive the command stream to the memory structure. For example, the first memory controller port 104 may reissue the command stream from a point where the first redrive device 108 terminated the command stream in response to detecting the transmission error 120. In this case, the first memory controller port 104 may reissue the command stream to the first redrive device 108 starting with the first command.

However, if the soft reset is not successful in clearing the first high speed link of the alert status frames then the first high speed link may not be ready to receive the reissued commands during the replay action. For instance, the first memory controller port 104 may continue to receive alert status frames on the northbound link of the first high speed link after performing the soft reset. The first memory controller port 104 may initiate a link retrain action as the first corrective action 122. The link retrain action may include retraining the first high speed link between the first memory controller port 104 and the first redrive device 108. The first memory controller port 104 may perform the replay action after the link retrain action has prepared the first high speed link for the receipt of the reissued commands. For example, after the first high speed link is retrained, the first memory controller port 104 may reissue the command stream from a point where the first redrive device 108 terminated the command stream in response to detecting the transmission error 120.

Alternatively, the first memory controller port 104 may initiate the first corrective action 122 in response to the detection of the transmission error 120 in the northbound link of the first high speed link. For instance, the first memory controller port 104 may detect a CRC error in the data received via the northbound link of the first high speed link. The first memory controller port 104 may determine that a second command in the command stream issued via the southbound link of the first high speed link resulted in the corrupted data in the northbound link. For example, the first memory controller port 104 may initiate the replay action by reissuing the command stream to the first redrive device 108 via the southbound link of the first high speed link starting with the second command.

In response to detecting the transmission error 120 in the first high speed link via the southbound link or the northbound link, the memory controller 102 may determine whether the second memory controller port 106 initiated a corrective action (e.g., the second corrective action 124). In response to detecting the second corrective action 124, the memory controller 102 may compare the first corrective action 122 and the second corrective action 124. Comparing the corrective actions may include determining a severity of each of the corrective actions and determining which corrective action was initiated first. The severity of the corrective action may be based on a number of clock cycles needed to perform the corrective action. The link retrain action may take more clock cycles to perform than the replay action and is therefore more severe. Based on the comparison, the memory controller 102 may indicate which corrective action will be completed first. The memory controller may also indicate the order in which the memory controller ports will become available for processing normal traffic (e.g., the incoming read commands 126). In mirrored mode, the incoming read commands may be distributed to either memory controller port.

The memory controller 102 may distribute the incoming read commands 126 based on the comparison of the first corrective action 122 and the second corrective action 124. The address translation unit 112 may distribute the incoming read commands 126. For instance, the address translation unit 112 may determine based on the comparison that the second memory controller port 106 will complete the second corrective action 124 before the first memory controller port 104 will complete the first corrective action 122. The address translation unit 112 may direct the incoming read commands 126 to the second memory controller port 106. Directing the incoming read commands 126 to the second memory controller port 106 may prevent the incoming read commands 126 from being stalled on the first memory controller port 104 as the first memory controller port 104 completes the first corrective action 122. Preventing the incoming read commands 126 from becoming delayed may improve memory latency. In applications where the system 100 is streaming audio or video, preventing read commands from becoming backlogged at a memory controller port may prevent potentially noticeable effects such as gaps in the audio or the video.

Figure 2:
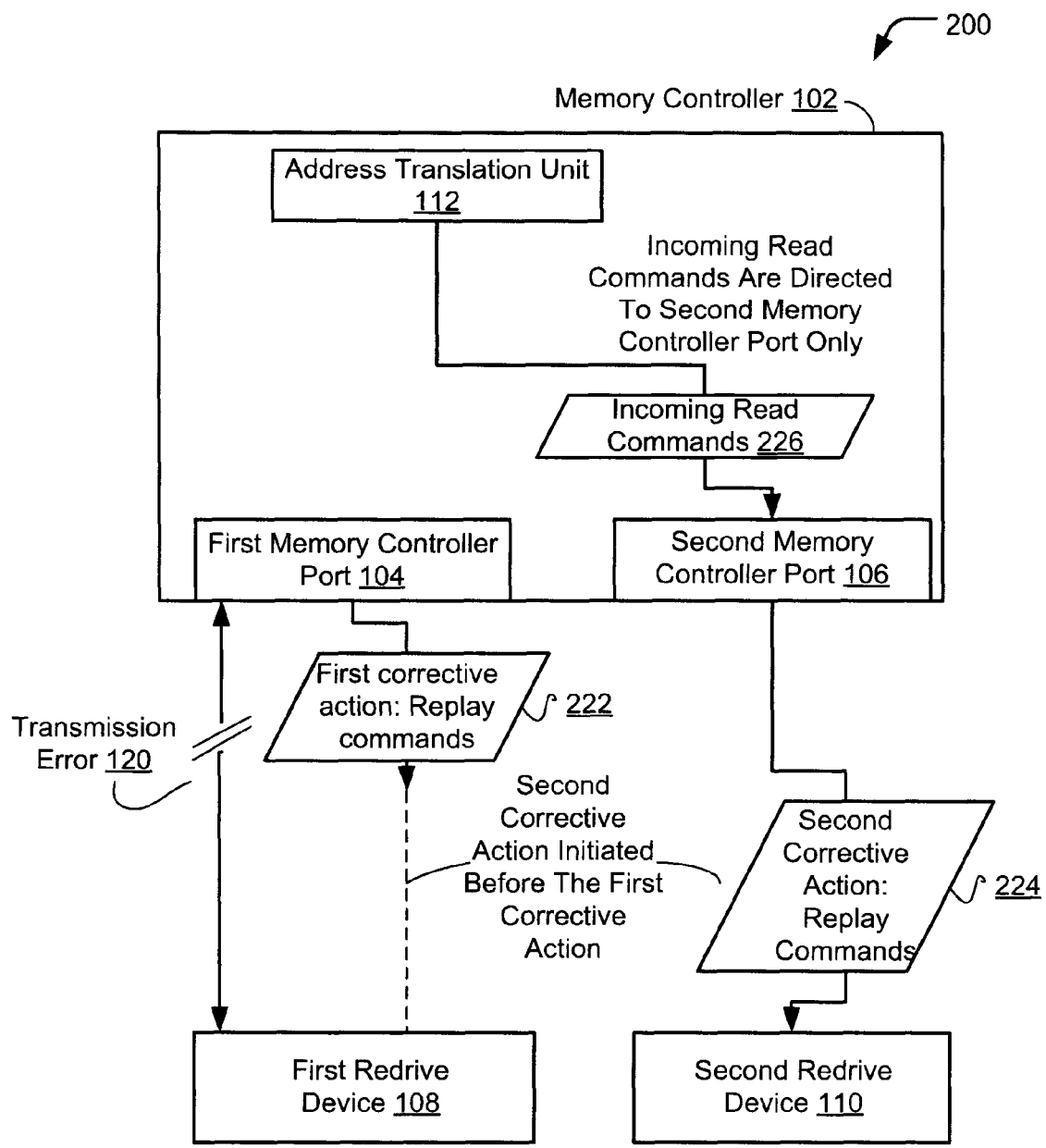
FIG. 2 is a block diagram of a second embodiment of a system to schedule commands at a memory controller.

FIG. 2 is a diagram of a second embodiment of a system to schedule commands at a memory controller and is generally designated 200. The system 200 includes many elements found in the system 100 referred to in FIG. 1, where similar elements have the same reference number.

The first memory controller port 104 may transmit a stream of commands to the first redrive device 108 via the southbound link of the first high speed link. The first redrive device 108 may decode and reformat the stream of commands to send to a memory structure (not illustrated) connected to the first redrive device 108. The memory structure may retrieve data in response to the command stream and may transmit the data to the first redrive device 108. The first redrive device 108 may reformat the data received from the memory structure and transmit the reformatted data to the first memory controller port 104 via the northbound link of the first high speed link.

The first redrive device 108 may detect a transmission error in the command stream received via the southbound link of the first high speed link. For instance, the first redrive device 108 may determine that a first command within the command stream contains an ECC or CRC single bit error. After detecting the transmission error 120 the first redrive device 108 may drop all subsequent commands in the command stream and return an alert status frame to the first memory controller port 104.

The first redrive device 108 may return a stream of alert status frames to the first memory controller port 104 via the northbound link of the first high speed link in response to the transmission error 120. The first memory controller port 104 may use the received alert status frames to detect the transmission error 120 between the first memory controller port 104 and the first redrive device 108. For example, the first memory controller port 104 may determine that the transmission error 120 occurred in the southbound link of the first high speed link based on the receipt of the alert status frame via the northbound link of the first high speed link.

The first memory controller port 104 may detect the transmission error 120 in the data received from the first redrive device 108 via the northbound link. For instance, the first memory controller port 104 may include logic that checks the data received from the first redrive device 108 for CRC errors. For example, the CRC checking may indicate that the data received from the first redrive device 108 contains a transmission error (e.g., the transmission error 120).

In response to the detection of the transmission error 120, the memory controller 102 may initiate the first corrective action 222 at the first memory controller port 104. The first corrective action 222 may be a replay action. The replay action may be selected as the first corrective action 222 in instances where the first high speed link is ready for reissuance of the command stream. For instance, after receiving the alert status frame the first memory controller port 104 may issue a soft reset of the first high speed link.

If the soft reset is successful in clearing the first high speed link of the alert status frames then the first high speed link may be ready for reissuance of the command stream. The first memory controller port 104 may initiate the replay action as the first corrective action 222. For example, the first redrive device 108 may detect the transmission error 120 in the first command of the command stream received via the southbound link of the first high speed link.

In response to detecting the transmission error 120, the first redrive device 108 may drop all subsequent commands in the command stream that were received after the first command. The first redrive device 108 may not redrive the first command or the subsequent commands to the memory structure. The replay action may be used to reissue the command stream to the first redrive to allow the first redrive device 108 to redrive the command stream to the memory structure. For instance, the first memory controller port 104 may reissue the command stream from a point where the first redrive device 108 terminated the command stream in response to the transmission error 120. The first memory controller port 104 may reissue the command stream to the first redrive device 108 starting with the first command.

However, if the soft reset is unsuccessful in clearing the first high speed link of the alert status frames then the first high speed link may not be ready to receive the reissued commands via the replay action. For example, the first memory controller port 104 may continue to receive alert status frames on the northbound link of the first high speed link after performing the soft reset. The first memory controller port 104 may initiate a link retrain action as the first corrective action 222. The link retrain action may include retraining the first high speed link between the first memory controller port 104 and the first redrive device 108.

The first memory controller port 104 may perform the replay action after the link retrain action has prepared the first high speed link for the receipt of the reissued commands. For instance, after the first high speed link is retrained, the first memory controller port 104 may reissue the command stream from a point where the first redrive device 108 terminated the command stream in response to detecting the transmission error 120.

Alternatively, the first memory controller port 104 may initiate the first corrective action 222 in response to the detection of the transmission error 120 in the northbound link of the first high speed link. For example, the first memory controller port 104 may detect a CRC error in the data received via the northbound link of the first high speed link. The first memory controller port 104 may determine that a second command in the command stream issued via the southbound link of the first high speed link resulted in the corrupted data in the northbound link of the first high speed link. For instance, the first memory controller port 104 may initiate the replay action by reissuing the command stream to the first redrive device 108 via the southbound link of the first high speed link starting with the second command.

In response to detecting the transmission error 120 in the first high speed link via the southbound link or the northbound link, the memory controller 102 may determine whether the second memory controller port 106 initiated a corrective action (e.g., the second corrective action 224). In response to detecting the second corrective action 224, the memory controller 102 may compare the first corrective action 222 and the second corrective action 224. Comparing the corrective actions may include determining a severity of each of the corrective actions and determining which corrective action was initiated first.

The severity of the corrective action may be based on a number of clock cycles needed to perform a corrective action. The link retrain action takes more clock cycles to perform than the replay action and is therefore more severe. Based on the comparison, the memory controller 102 may indicate which corrective action will be completed first and the order in which the memory controller ports will become available for processing normal traffic (e.g., the incoming read commands 226).

The memory controller 102 may distribute the incoming read commands 226 based on the comparison of the first corrective action 222 and the second corrective action 224. For example, the memory controller 102 may determine based on the comparison that the second memory controller port 106 will complete the second corrective action 224 before the first memory controller port 104 will complete the first corrective action 222. The memory controller 102 may direct the incoming read commands 226 to the second memory controller port 106.

As another example, the memory controller 102 may distribute the incoming read commands 226 to the second memory controller port 106 in response to a comparison. The comparison may indicate that the second corrective action 224 initiated a second replay action before the first corrective action 222 initiated a first replay action. Directing the incoming read commands 226 to the second memory controller port 106 may prevent the incoming read commands 226 from being stalled on the first memory controller port 104 as the first memory controller port 104 completes the first corrective action 222. Preventing the incoming read commands 226 from becoming delayed may improve memory latency. For example, in applications where the system 200 is streaming audio or video, preventing read commands from becoming backlogged at a memory controller port may prevent potentially noticeable effects such as gaps in the audio or the video.

Figure 3:
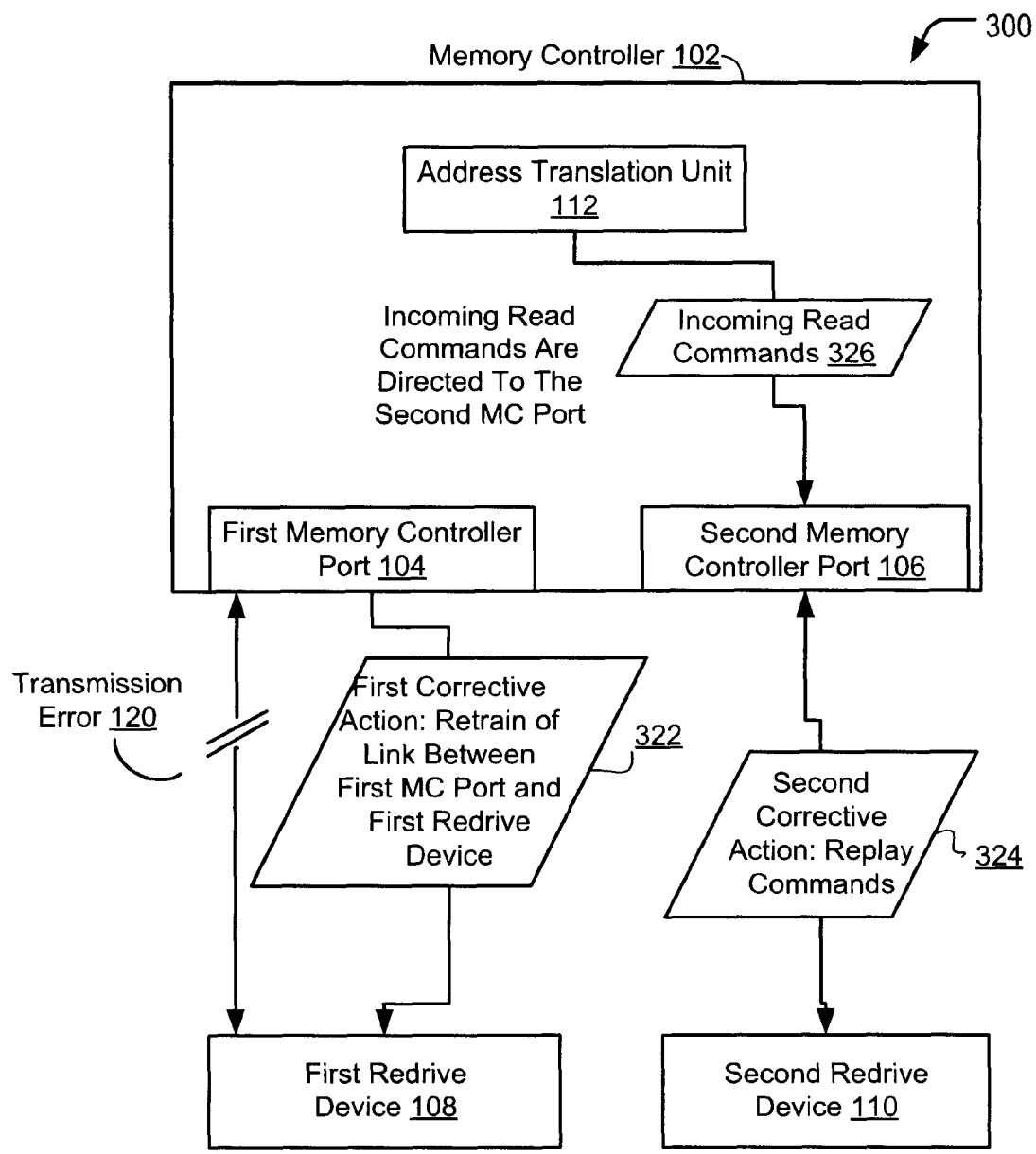
FIG. 3 is a block diagram of a third embodiment of a system to schedule commands at a memory controller.

FIG. 3 is a diagram of a third embodiment of a system to schedule commands at a memory controller and is generally designated 300. The system 300 includes many elements found in the system 100 referred to in FIG. 1, where similar elements have the same reference number.

During operation, the first memory controller port 104 may transmit a stream of commands to the first redrive device 108 via the southbound link of the first high speed link. The first redrive device 108 may decode and reformat the stream of commands to send to a memory structure (not illustrated) connected to the first redrive device 108. The memory structure may retrieve data in response to the command stream and may transmit the data to the first redrive device 108. The first redrive device 108 may reformat the data received from the memory structure and transmit the reformatted data to the first memory controller port 104 via the northbound link of the first high speed link.

The first redrive device 108 may detect a transmission error in the command stream received via the southbound link. For instance, the first redrive device 108 may determine that a first command within the command stream contains a single bit error. After detecting the transmission error 120 the first redrive device 108 may drop all subsequent commands in the command stream and return an alert status frame to the first memory controller port 104.

The first redrive device 108 may return a stream of alert status frames to the first memory controller port 104 via the northbound link of the first high speed link in response to the transmission error 120. The first memory controller port 104 may use the received alert status frames to detect the transmission error 120 between the first memory controller port 104 and the first redrive device 108. For example, the first memory controller port 104 may determine that the transmission error 120 occurred in the southbound link of the first high speed link. This determination may be based on the receipt of the alert status frame via the northbound link of the first high speed link.

The first memory controller port 104 may detect the transmission error 120 in the data received from the first redrive device 108 via the northbound link of the first high speed link. For instance, the first memory controller may include logic that checks the data received from the first redrive device 108 for CRC errors. For example, the CRC checking may indicate that the data received from the first redrive device 108 may contain a transmission error (e.g., the transmission error 120).

In response to the detection of the transmission error 120, the memory controller 102 may initiate the first corrective action 322 at the first memory controller port 104. The first corrective action 322 is a replay action. The replay action may be selected as the first corrective action 322 where the first high speed link is ready for reissuance of the command stream. For instance, after receiving the alert status frame the first memory controller port 104 may issue a soft reset of the first high speed link. If the soft reset is successful in clearing the first high speed link of the alert status frames then the first high speed link may be ready for reissuance of the command stream. The first memory controller port 104 may initiate the replay action as the first corrective action 322. For example, the first redrive device 108 may detect the transmission error 120 in the first command of the command stream received via the southbound link of the first high speed link.

In response to detecting the transmission error 120, the first redrive device 108 may drop all subsequent commands in the command stream that were received after the first command. The first redrive device 108 may not redrive the first command or the subsequent commands to the memory structure. The replay action may be used to reissue the command stream to the first redrive to allow the first redrive device 108 to redrive the command stream to the memory structure. For instance, the first memory controller port 104 may reissue the command stream from a point where the first redrive device 108 terminated the command stream in response to detecting the transmission error 120. The first memory controller port 104 may reissue the command stream to the first redrive device 108 starting with the first command.

If the soft reset unsuccessful in clearing the first high speed link of the alert status frames, then the first high speed link may not be ready to receive the reissued commands via the replay action. For example, the first memory controller port 104 may continue to receive alert status frames on the northbound link of the first high speed link after performing the soft reset. The first memory controller port 104 may initiate a link retrain action as the first corrective action 322. The link retrain action may include retraining the first high speed link between the first memory controller port 104 and the first redrive device 108.

The first memory controller port 104 may execute the replay action after the link retrain action has prepared the first high speed link for the receipt of the reissued commands. For instance, after the first high speed link is retrained, the first memory controller port 104 may reissue the command stream from a point where the first redrive device 108 terminated the command stream in response to detecting the transmission error 120.

Alternatively, the first memory controller port 104 may initiate the first corrective action 322 in response to the detection of the transmission error 120 in the northbound link of the first high speed link. For example, the first memory controller port 104 may detect a CRC error in the data received via the northbound link of the first high speed link. The first memory controller port 104 may determine that a second command in the command stream issued via the southbound link of the first high speed link resulted in the corrupted data in the northbound link of the first high speed link. For instance, the first memory controller port 104 may initiate the replay action by reissuing the command stream to the first redrive device 108 via the southbound link of the first high speed link starting with the second command.

In response to detecting the transmission error 120 in the first high speed link via the southbound link or the northbound link, the memory controller 102 may determine whether the second memory controller port 106 initiated a corrective action (e.g., the second corrective action 324). In response to detecting the second corrective action 324, the memory controller 102 may compare the first corrective action 322 and the second corrective action 324. Comparing the corrective actions may include determining a severity of each of the corrective actions and determining which corrective action was initiated first.

The severity of the corrective action may be an indication of how many clock cycles a memory controller would take to perform the corrective action. The link retrain action may take more clock cycles to perform that the replay action and therefore is more severe. Based on the comparison, the memory controller 102 may indicate which corrective action will be completed first and the order in which the memory controller ports will become available for processing normal traffic (e.g., the incoming read commands 326).

The memory controller 102 may distribute the incoming read commands 326 based on the comparison of the first corrective action 322 and the second corrective action 324. For instance, the memory controller 102 may determine based on the comparison that the first corrective action 322 is a link retrain action and the second corrective action 324 is a replay action. The link retrain action may be more severe than the replay action because the link retrain action takes longer to perform.

Based on this comparison, the memory controller 102 may determine that the second memory controller port 106 will complete the second corrective action 324 (i.e., the replay action) before the first memory controller port 104 will complete the first corrective action 322 (i.e., the link retrain action). The memory controller 102 may direct the incoming read commands 326 to the second memory controller port 106. Directing the incoming read commands 326 to the second memory controller port 106 may prevent the incoming read commands 326 from being stalled on the first memory controller port 104 as the first memory controller port 104 completes the first corrective action 322. Preventing the incoming read commands 326 from becoming delayed may improve memory latency. For example, in applications where the system 300 is streaming audio or video, preventing read commands from becoming backlogged at a memory controller port may prevent potentially noticeable effects such as gaps in the audio or the video.

Figure 4:
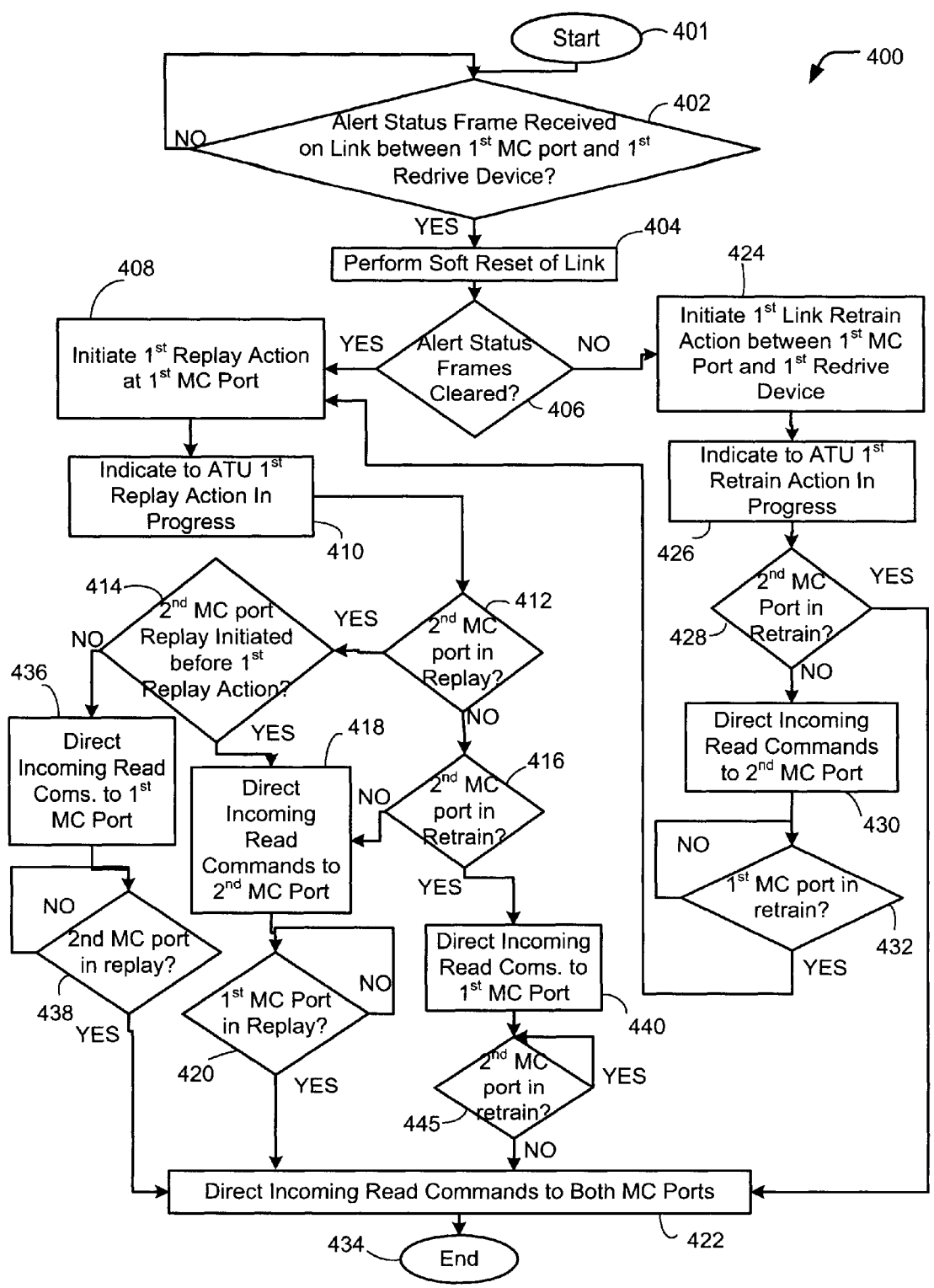
FIG. 4 is a flow diagram of a first embodiment of a method to schedule commands at a memory controller.

Referring to FIG. 4, a diagram of a first embodiment of a method to schedule commands at a memory controller is illustrated and is generally designated 400. The method 400 commences in start state 401. At block 402, a first memory controller port may determine whether an alert status frame is received on a link between the first memory controller port and a first redrive device. If the first memory controller port may not receive the alert status frames, the logic returns to block 402. If an alert status frame is received, the first memory controller port performs a soft reset, at block 404. Thereafter, the first memory controller port may determine at block 406 whether the link is clear of alert status frames. If so, the first memory controller port may initiate at block 408 a first replay action at the first memory controller port.

The first memory controller port may indicate to an address translation unit at block 410 that the first replay action is in progress at the first memory controller port. At block 412, the memory controller may determine whether a second memory controller port is engaged in a replay action (e.g., the second replay action). If the second memory controller port is not engaged in the second replay action, the logic proceeds to block 416. If the second memory controller is engaged in the second replay action, the logic proceeds to block 414.

At block 414, the memory controller determines whether the second memory controller port initiated the second replay action before the first memory controller port initiated the first replay action. If the second memory controller port initiated the second replay action before the first memory controller port in the first replay action, the memory controller directs incoming read commands at block 418 to the second memory controller port. At block 420, the first memory controller port may determine whether the first memory controller port has completed the first replay action. If the first memory controller port has completed the first replay action, the memory controller directs the incoming read commands at block 422 to both the first memory controller port and the second memory controller port. The logic may end at state 434.

If the first memory controller port has not completed the first replay action at block 420, the logic returns to the block 420. If the second memory controller port did not initiate the second replay action before the first memory controller port initiated the first replay action at block 414, the memory controller may direct the incoming read commands at block 436 to the first memory controller port.

At block 438, the memory controller may determine whether the second memory controller port has completed the second replay action. If so, the memory controller may direct at block 422 the incoming read commands to both the first memory controller port and the second memory controller port. The logic may end at state 434. At block 438, if the second memory controller port has not completed the second reply action, the logic returns to block 438.

At block 416, the memory controller may determine whether the second memory controller port is engaged in a retrain of a link between the second memory controller port and a second redrive device. If the second memory controller port initiated the second link retrain action, the memory controller may direct at block 440 the incoming read commands to the first memory controller port. At block 445, the memory controller determines whether the second memory controller port is in retrain. If the second memory controller port is in retrain, the logic returns to block 445. If the second memory controller port has completed the retrain, the memory controller at block 422 may direct the incoming read commands to both the first memory controller port and the second memory controller port. The logic may end at state 434.

If the second memory controller port is not engaged in the second link retrain action at block 416, the memory controller at block 418 may direct the incoming read commands to the second memory controller port. At block 420, the first memory controller port may determine whether the first memory controller port has completed the first replay action. If the first memory controller port has not completed the first replay action, the logic returns to the block 420. If the first memory controller port has completed the first replay action, the memory controller at block 422 may direct the incoming read commands to both the first memory controller port and the second memory controller port. The logic may end at state 434.

If the alert status frames are cleared at block 406, the first memory controller port initiates at block 424 the first link retrain action between the first memory controller port and the first redrive device. The first memory controller port indicates to the address translation unit that the first memory controller port has initiated the first link retrain, at block 426. The memory controller determines at block 428 whether the second memory controller port is engaged in the second link retrain action.

If the second memory controller port is retraining the link between the second memory controller port and the second redrive device, the memory controller at block 422 may direct the incoming read commands to both the first memory controller port and the second memory controller port. The logic ends at state 434.

If the second memory controller port is not engaged in the second link retrain action at block 428, the logic proceeds to block 430 and the memory controller may direct the incoming read commands to the second memory controller port. At block 432, the memory controller determines whether the first memory controller port has completed the first link retrain action. If the first memory controller port has not completed the first link retrain action, the logic returns to block 432. If the first memory controller port has completed retraining the link between the first memory controller port and the first redrive device, the first memory controller port initiates the first replay action at block 408 at the first memory controller port. The first memory controller port indicates to an address translation unit at block 410 that the first replay action is in progress at the first memory controller port. At block 412, the memory controller determines whether a second memory controller port is engaged in the second replay action. If the second memory controller port has not initiated the second replay action, the logic proceeds to block 416. If the second memory controller has initiated the second replay action, the logic proceeds to block 414.

At block 414, the memory controller may determine whether the second memory controller port initiated the second replay action before the first memory controller port initiated the first replay action. If the second memory controller port initiated the replay action before the first memory controller port, the logic proceeds to block 418 and the memory controller directs incoming read commands to the second memory controller port.

The first memory controller port may determine at block 420 whether the first memory controller port has completed the first replay action. If the first memory controller port has completed the first replay action, the memory controller at block 422 may direct the incoming read commands to both the first memory controller port and the second memory controller port. The logic may end at state 434. If the first memory controller port has not completed the replay action, the logic may return to block 420 until the first replay action at the first memory controller port is complete.

If the second memory controller port did not initiate the second replay action before the first memory controller port initiated the first replay action at block 414, the memory controller directs at block 436 the incoming read commands to the first memory controller port. At block 438, the memory controller may determine whether the second memory controller port has completed the second replay action. If so, the memory controller directs at block 422 the incoming read commands to both the first memory controller port and the second memory controller port. The logic may end at state 434. At block 438, if the second memory controller port has not completed the second reply action, the logic may return to block 438.

At block 416, the memory controller may determine whether the second memory controller port is engaged in a retrain of a link between the second memory controller port and a second redrive device. If the second memory controller port initiated the second link retrain action, the memory controller may direct at block 440 the incoming read commands to the first memory controller port. At block 445, the memory controller determines whether the second memory controller port is in retrain. If the second memory controller port is in retrain, the logic returns to block 445. If the second memory controller port has completed the retrain, the memory controller at block 422 may direct the incoming read commands to both the first memory controller port and the second memory controller port. The logic may end at state 434.

At block 416, if the second memory controller port is not engaged in the second link retrain action, the memory controller at block 418 may direct the incoming read commands to the second memory controller port. At block 420, the first memory controller port determines whether the first memory controller port has completed the first replay action. If the first memory controller port has not completed the first replay action, the logic returns to the block 420. If the first memory controller port has completed the first replay action, the memory controller at block 422 may direct the incoming read commands to both the first memory controller port and the second memory controller port. The logic may end at state 434.

Figure 5:
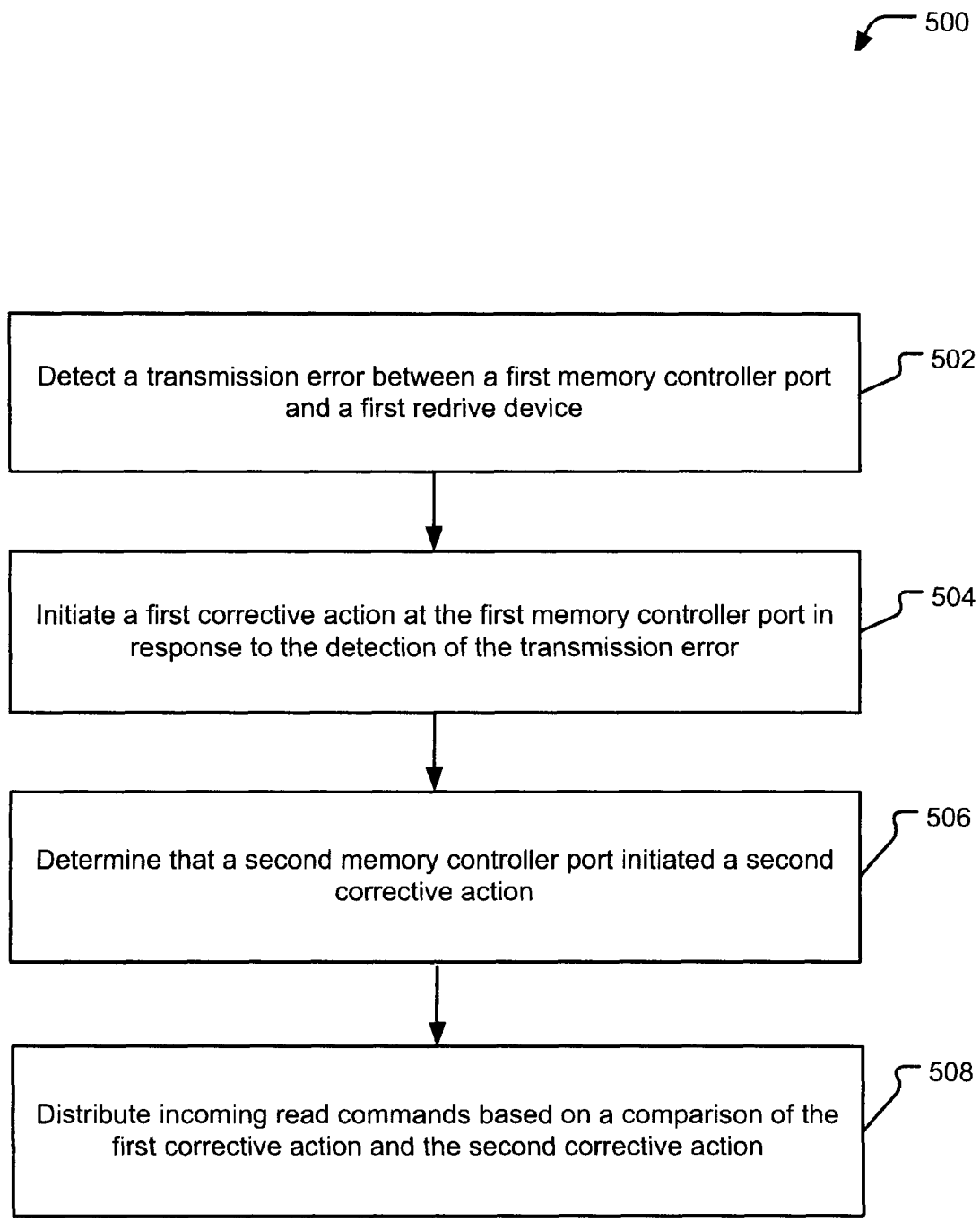
FIG. 5 is a flow diagram of a second embodiment of a method to schedule commands at a memory controller.

FIG. 5 is a flow diagram of a second embodiment of a method 500 of scheduling commands at a memory controller. The method 500 may be executed by any of the systems of FIGS. 1-3, or any combination thereof. The method 500 may include detecting a transmission error between a first memory controller port and a first redrive device, at block 502. For instance, the memory controller 102 of FIGS. 1-3 may detect the transmission error 120 between the first memory controller port 104 and the first redrive device 108.

The method 500 may also include initiating a first corrective action at the first memory controller port in response to the detection of the transmission error, at block 504. For example, the memory controller 102 of FIGS. 1-3 initiates the first corrective action 122 at the first memory controller port 104 in response to the detection of the transmission error 120. The method 500 further includes determining that a second memory controller port initiated a second corrective action, at block 506. For instance, the memory controller 102 of FIGS. 1-3 may determine that the second memory controller port 106 initiated the second corrective action 124. The method 500 may also include distributing incoming read commands based on a comparison of the first corrective action and the second corrective action, at block 508. For example, the memory controller 102 of FIGS. 1-3 distributes the incoming read commands 126 based on the comparison of the first corrective action 122 and the second corrective action 124.

Figure 6:
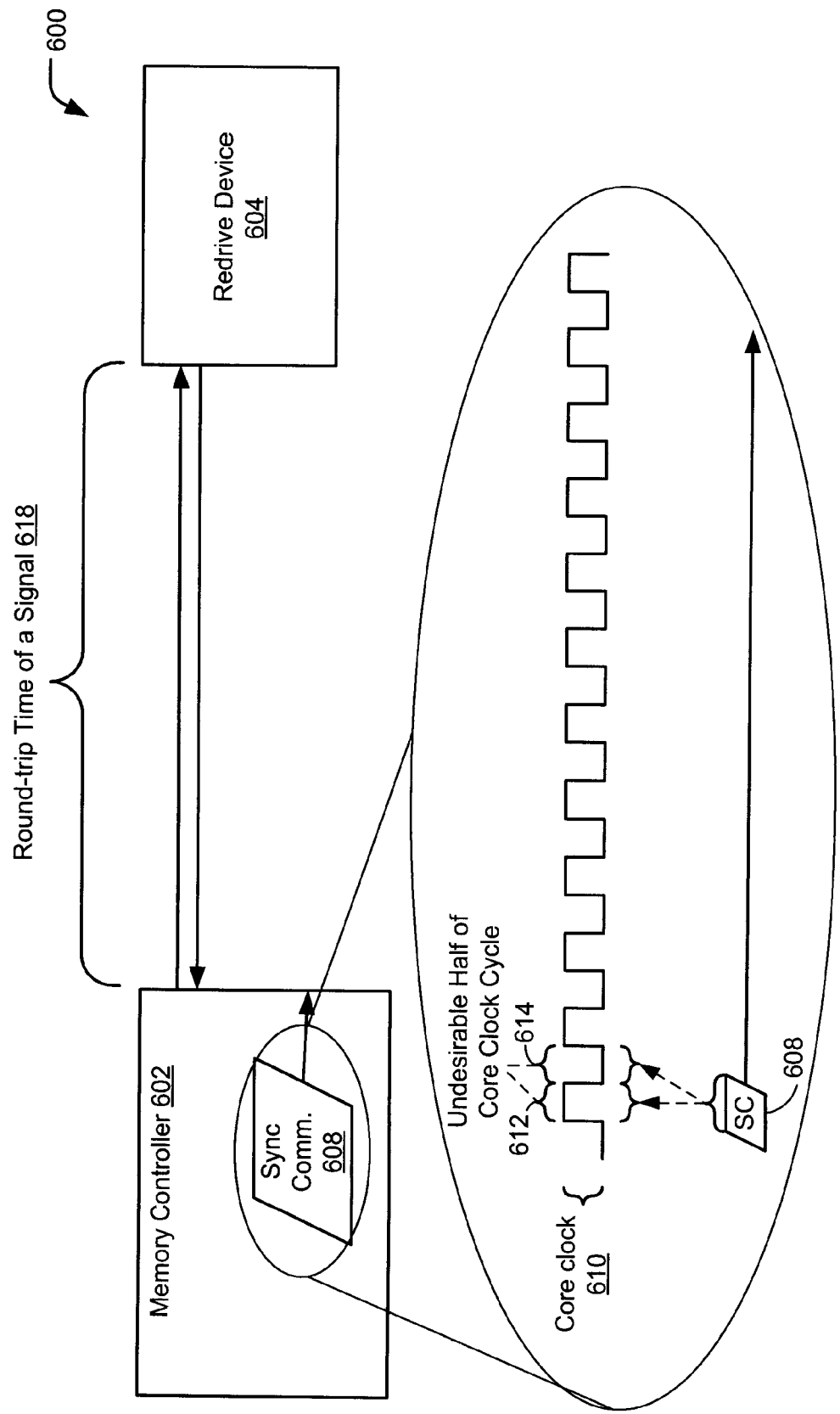
FIG. 6 is a block diagram of a fourth embodiment of a system to schedule commands at a memory controller.

FIG. 6 is a diagram of a fourth embodiment of a system configured to schedule commands at a memory controller and is generally designated 600. The system 600 includes a memory controller 602 and a redrive device 604 connected via a link 606. The link 606 refers to two unidirectional high speed links. For instance, the memory controller 602 may transmit to the redrive device 604 via a southbound link, and the redrive device 604 may transmit to the memory controller 602 via a northbound link.

The memory controller 602 may include a core clock domain and a datalink layer domain that are synchronous in nature, but not actually the same frequency. The core clock domain and the datalink layer may be multiples of one another. The core clock domain may include the portions of the memory controller 602 that perform processes based on a core clock 610. The datalink layer domain may include the portions of the memory controller 602 that perform processes based on a memory clock. For example, in the datalink layer domain, the memory controller 602 may receive data from the redrive device 604 via the link 606 based on the memory clock. After the data is received in the datalink layer domain, the memory controller 602 may align the data to the core clock 610 before transmitting via the core clock domain the data to a processor that is synchronized with the core clock 610.

For instance, alignment with the core clock domain may include delaying first data received in the datalink layer domain during a second half of the core clock cycle by half a core clock cycle. The first data received during the second half of the core clock cycle may not be transmitted to the core clock domain until the next first half of the core clock cycle. Delaying the first data until the next first half of the core clock cycle may delay second data received during the next first half of the core clock cycle by half a core clock cycle. This delay may, in turn, delay third data received during a following second half of the core clock cycle. Fourth data received during a following first half of the core clock cycle may also be delayed, as well as fifth data received during a following second half of the core clock cycle. If non-data is received that may be extracted in the datalink layer domain and not transmitted to the core clock domain, a gap may form between the second data and the fourth data. The delayed second data may fill the half core clock cycle gap without delaying the fourth data. Therefore, the first data, second data, fourth data, and fifth data may be transmitted efficiently to the core clock domain without the gap.

The memory controller 602 may schedule transmission of commands to result in a sequence of data that when aligned to the core clock 610 may be transmitted to the core clock domain without the gap. Scheduling the commands to result in gapless data may include scheduling a synchronization command 608 to be transmitted on an undesirable half of the core clock cycle. Scheduling the synchronization command 608 on the undesirable half of the core clock cycle may include determining which half of the core clock cycle transmission on which would produce data that may be transmitted without the gap. Efficiently scheduling the commands at the memory controller 602 to prevent gaps in data during core clock alignment may improve the efficiency of the memory controller 602 and reduces memory latency.

The memory controller 602 may be configured to determine that the link 606 between the memory controller 602 and the redrive device 604 requires the synchronization command 608 to be transmitted from the memory controller 602 to the redrive device 604. The memory controller 602 may be configured to determine the undesirable half of the core clock cycle based on a round-trip time 618 of a signal. In a particular embodiment, the memory controller 602 is configured to schedule transmission of the synchronization command 608 based on the determination of the undesirable half of the core clock cycle.

The memory controller 602 may determine that the link 606 between the memory controller 602 and the redrive device 604 requires a synchronization command (e.g., the synchronization command 608). Determining that the link 606 requires the synchronization command 608 may include the memory controller 602 determining a number of frames transmitted over the link. The memory controller 602 may compare the number of frames transmitted over the link 606 to an upper threshold and a lower threshold.

The upper threshold may be the maximum number of frames that can be transmitted over the link 606 before the synchronization command 608 must be transmitted to maintain link synchronization. The lower threshold may be the minimum number of frames that must be transmitted before the synchronization command 608 is transmitted. For example, the lower threshold may be forty-two frames and the upper threshold may be eighty-four frames. After the memory controller 602 has transmitted forty-two normal frames (e.g., read commands) the memory controller 602 may determine that the link 606 requires the synchronization command 608 to be transmitted at some point before the eighty-fourth frame is transmitted. For instance, to maintain link synchronization, the memory controller 602 may transmit the synchronization command 608 on the southbound link to the redrive device 604 between the forty-second frame and the eighty-fourth frame.

In response to determining that the link 606 requires the synchronization command 608, the memory controller 602 may schedule the transmission of the synchronization command 608. Scheduling the synchronization command 608 may include determining which half of the core clock cycle to transmit the synchronization command 608.

Determining which half of the core clock cycle to transmit the synchronization command 608 may include determining the desirable half and the undesirable half. The desirable half of the core clock cycle may refer to the half of the core clock cycle upon which transmission of a particular command results in data that arrives at the memory controller 602 on the first half of the core clock cycle. Data that arrives at the first half of the core clock cycle is aligned with the core clock domain and therefore may not create the delay. The desirable half of the core clock cycle results in efficient receipt of data at the memory controller 602. The undesirable half of the core clock cycle may refer to the half of the core clock cycle upon which transmission of the particular command results in data that arrives at the memory controller 602 on the second half of the core clock cycle. Data that arrives at the second half of the core clock cycle is not aligned with the core clock domain and therefore may create the delay. In this case, transmitting commands on the undesirable half of the core clock cycle may result in inefficient receipt of the data at the memory controller 602.

Determining which half of the core clock cycle is the undesirable half is based on the round-trip time 618 of a signal. The memory controller 602 may determine the number of core clock cycles between the particular command being issued to the redrive device 604 and the data in response to the particular command arriving at the memory controller 602. During transmission of the particular command over the link, wire delay may contribute to the round-trip time 618. Receiver, internal logic, cross chip wire, and driver delay in the redrive device 604 may contribute to the round-trip time 618. For example, the round-trip time 618 between issuance of the particular command and the data arriving in response may be eight full core clock cycles and one half core clock cycle. If the particular command was issued on the first half of the core clock cycle, data would have returned on the second half of the core clock cycle. Data returned on the second half of the core clock cycle creates the delay. In this case, the first half of the core clock cycle is the undesirable half.

Alternatively, the memory controller 602 may determine the number of memory clocks between the particular command being issued to the redrive device 604 and the data in response to the particular command arriving at the memory controller 602. The memory clock is twice as fast as the core clock 610. For instance, the round-trip time 618 between issuance of the particular command and the data arriving in response may be seventeen memory clocks. As another example, if the round-trip time 618 was nine full core clock cycles, issuance of the particular command on the second half of the core clock cycle would result in data returned on the second half of the core clock cycle. In this case, the second half of the core clock cycle is the undesirable half.

The memory controller 602 stores the determination of which half of the core clock cycle is the undesirable half. Storing the determination may allow the memory controller 602 to avoid having to make the determination every time the requirement for the synchronization command 608 is detected. The memory controller 602 may re-determine which half of the core clock cycle is the undesirable half after the link 606 is retrained. For example, retraining the link 606 may impact the round-trip delay of the signal due to thermal or voltage drift. The memory controller 602 may re-determine periodically which half of the core clock cycle is the undesirable half. For instance, the memory controller 602 may perform the determination after a pre-set number of core clocks have occurred subsequent to a previous determination.

Scheduling transmission of the synchronization command 608 based on the undesirable half of the core clock cycle may include transmitting the synchronization command 608 on the undesirable half of the core clock cycle. Transmitting the synchronization command 608 to the redrive device 604 on the undesirable half may result in the synchronization status arriving at the memory controller 602 on the second half of the core clock cycle. The synchronization status is extracted in the datalink layer of the memory controller 602 and is not used in the core clock domain. If the synchronization status is received by the memory controller 602 on the second half of the core clock cycle, then data received before the synchronization status may be delayed by a half of the core clock cycle without delaying the data received after the synchronization status. By determining which half of the core clock cycle will result in the delay (e.g., an undesirable half of the core clock cycle) during realignment and scheduling the synchronization command 608 based on the determination, the memory controller 602 may prevent overhead associated with issuing the synchronization command. Reducing the synchronization overhead may improve the efficiency of the memory controller 602 and reduce memory latency.

Figure 7:
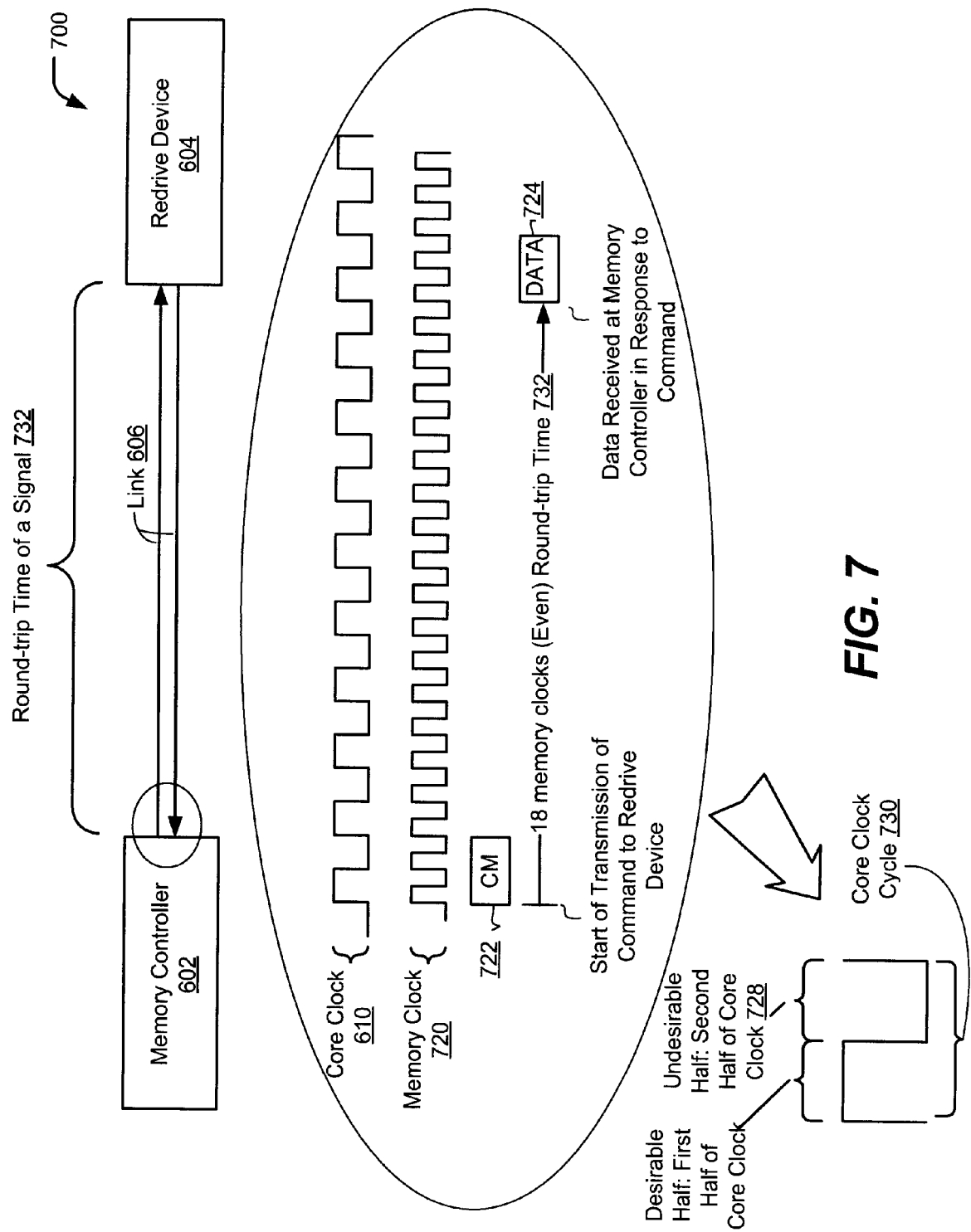
FIG. 7 is a block diagram of a fifth embodiment of a system to schedule commands at a memory controller.

FIG. 7 is a diagram of a fifth embodiment of a system to schedule commands at a memory controller 602 and is generally designated 700. The system 700 includes many elements found in the system 600 referred to in FIG. 6, where similar elements include the same reference number.

During operation, the determination of which half of the core clock cycle 730 is an undesirable half 728 may be based on a round-trip time 732 of a signal. The round-trip time 732 of the signal may be the number of core clock cycles between a particular command 722 being issued to the redrive device 604 and data 724 in response to the particular command 722 arriving at the memory controller 602. Alternatively, the round-trip time 732 of the signal may be determined based on the number of memory clock cycle between the particular command 722 being issued to the redrive device 604 and the data 724 in response to the particular command 722 arriving at the memory controller 602.

The memory controller 602 may determine that the round-trip time 732 is equivalent to an even number of memory clock cycles. For example, the round-trip time 732 between issuance of the particular command 722 and the data 724 arriving in response to the particular command 722 may be eighteen memory clock cycles. Eighteen memory clock cycles may correspond to nine full core clock cycles 730 when the memory clock is twice as fast as the core clock. Transmitting the particular command 722 on the second half of the core clock cycle 730 may result in the data 724 in response arriving at the memory controller 602 on the second half of the core clock cycle 730. Data arriving at the second half of the core clock cycle 730 is not aligned with the core clock domain and therefore may create delay. Because the transmission of the particular command 722 on the second half of the core clock cycle results in data 724 on the second half of the core clock cycle, the second half of the core clock cycle is the undesirable half 728.

By determining which half of the core clock cycle 730 will result in the delay (e.g., an undesirable half 728 of the core clock cycle 730) the memory controller 602 may prevent overhead associated with issuing the synchronization command. Reducing the synchronization overhead may improve the efficiency of the memory controller 602 and reduce memory latency.

Figure 8:
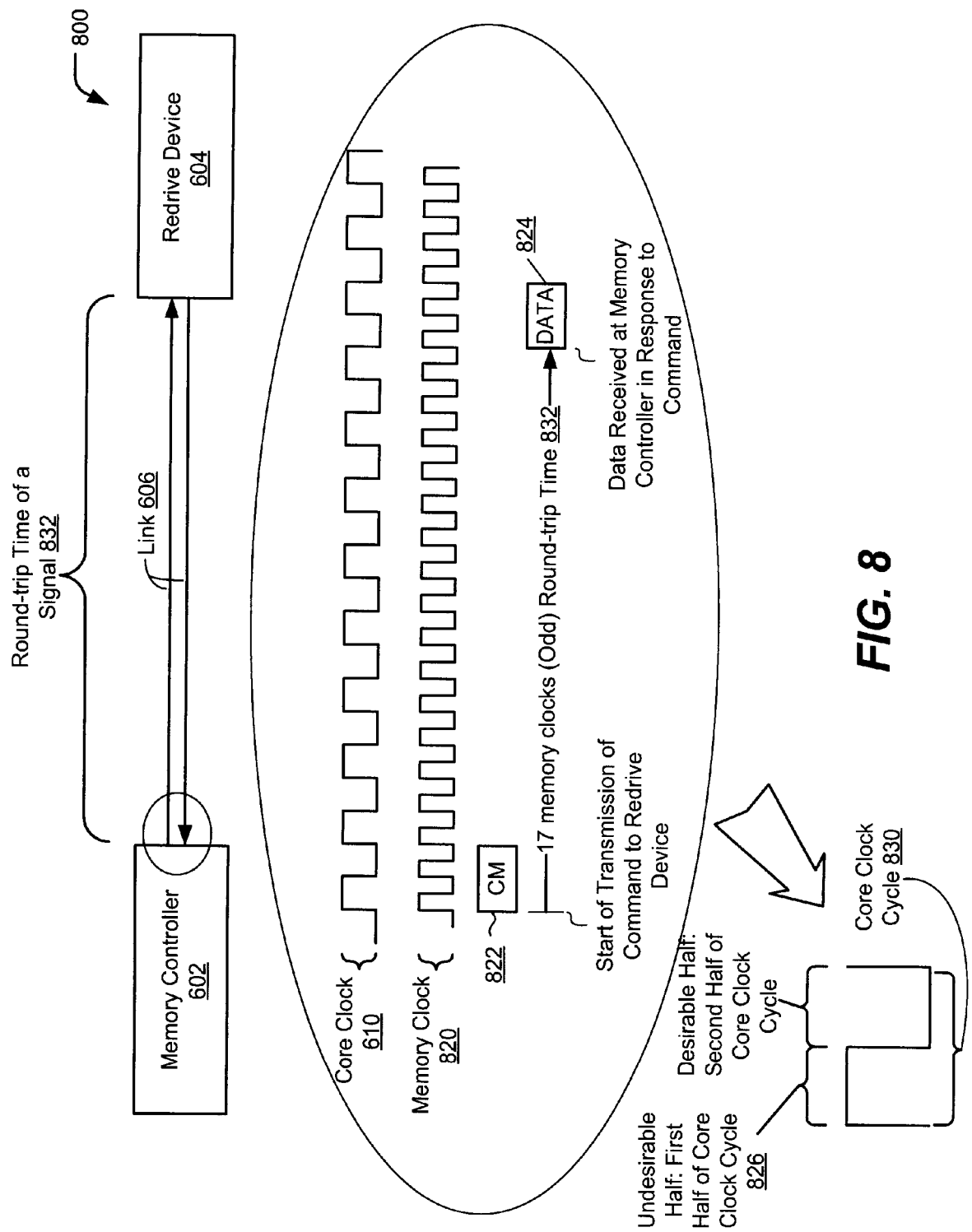
FIG. 8 is a block diagram of a sixth embodiment of a system to schedule commands at a memory controller.

FIG. 8 is a diagram of a sixth embodiment of a system to schedule commands at a memory controller 602 and is generally designated 800. The system 800 includes many elements found in the system 600 referred to in FIG. 6, where similar elements include the same reference number.

During operation, the determination of which half of the core clock cycle 830 is an undesirable half 826 may be based on a round-trip time 832 of a signal. The round-trip time 832 of the signal may be the number of core clock cycles between a particular command 822 being issued to the redrive device 604 and data 824 in response to the particular command 822 arriving at the memory controller 602. Alternatively, the round-trip time 832 of the signal may be determined based on the number of memory clock cycle between the particular command 822 being issued to the redrive device 604 and the data 824 in response to the particular command 822 arriving at the memory controller 602.

The memory controller 602 may determine that the round-trip time 832 is equivalent to an odd number of memory clock cycles. For instance, the round-trip time 832 between issuance of the particular command 822 and the data 824 arriving in response to the particular command 822 may be seventeen memory clock cycles. Seventeen memory clock cycles may correspond to eight full core clock cycles 830 and one half core clock cycle 830 when the memory clock 820 is twice as fast as the core clock 610. Transmitting the particular command 822 on the first half of the core clock cycle 830 results in the data 824 in response arriving at the memory controller 602 on the second half of the core clock cycle 830. Data arriving at the second half of the core clock cycle 830 is not aligned with the core clock domain and therefore may create delay. Because the transmission of the particular command 822 on the first half of the core clock cycle results in data 824 on the second half of the core clock cycle, the first half of the core clock cycle is the undesirable half 828.

By determining which half of the core clock cycle 830 will result in the delay (e.g., an undesirable half 828 of the core clock cycle 830) the memory controller 602 may prevent overhead associated with issuing the synchronization command. Reducing the synchronization overhead may improve the efficiency of the memory controller 602 and reduce memory latency.

Figure 9:
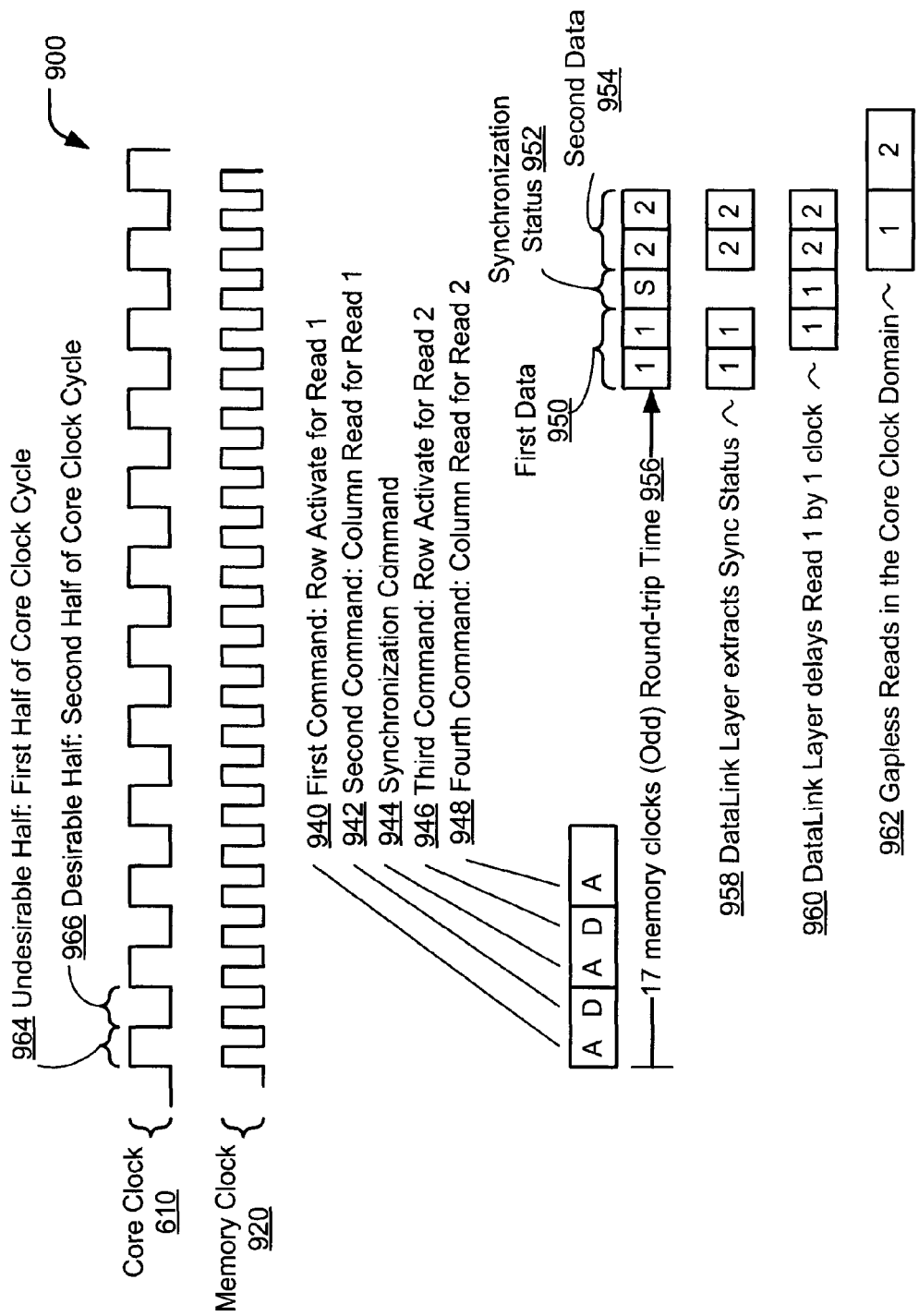
FIG. 9 is a block diagram of a seventh embodiment of a system to schedule commands at a memory controller.

FIG. 9 is a diagram of a seventh embodiment of a system to schedule commands at a memory controller and is generally designated 900. The system 900 includes many elements found in the system 600 referred to in FIG. 6, where similar elements include the same reference number.

The memory controller determines that the round-trip time 956 of a signal is seventeen memory clock 920 cycles. Based on the determination that the round-trip time 956 is an odd number, the memory controller may determine that the first half is the undesirable half 964 of the core clock 610 cycle. In response, the memory controller may schedule the transmission of the synchronization command 944 on the first half 964 of the core clock 610 cycle. The synchronization command 944 may be replaced with any command that results in non-data that may be extracted in the datalink layer. For example, the memory controller may transmit a first command 940 on the undesirable half 964 and a second command 942 on a desirable half 966 of the core clock 610 cycle. The memory controller may transmit the synchronization command 944 on the undesirable half 964, a third command 946 on the desirable half 966, and a fourth command 948 on the undesirable half 964.

The memory controller may receive first data 950 at a physical layer of the memory controller in response to the first command 940 and the second command 942. The memory controller may receive a synchronization status 952 in response to the synchronization command 944, and second data 954 in response to the third command 946 and the fourth command 948. For instance, frames arriving at the memory controller from the redrive device may follow a sequence where a first portion of the first data 950 arrives when the core clock 610 is on the second half of the core clock cycle. A second portion of the first data 950 may arrive when the core clock 610 is on a following first half of the core clock cycle. The synchronization status 952 may arrive when the core clock 610 is on a next second half of the core clock cycle. A first portion of the second data 954 may arrive when the core clock 610 is on a next first half of the core clock cycle. A second portion of the second data 954 may arrive when the core clock 610 is on a next second half of the core clock cycle.

The memory controller may extract 958 the synchronization status 952 at the data link layer of the memory controller. The synchronization status 952 may only be used in the data link layer of the memory controller and may not be transmitted to the core clock domain of the memory controller. A gap may be created between the first data 950 and the second data 954. The memory controller may delay 960 the first data 950 by a half core clock cycle to align the first data 950 with the core clock domain. For example, if the first portion of the first data 950 arrived on the second half of the core clock 610 cycle, the core clock domain of the memory controller may not receive the first portion of the first data 950 until a next half of the core clock cycle (i.e., the first half).

During the next first half of the core clock cycle, the memory controller may read the first data 950. With the synchronization status extracted and the second data 954 aligned with the core clock domain, the memory controller may read the second data 954 during a following first half of the core clock cycle. The memory controller may gather 962 the first data 950 and the second data 954 within two core clock cycles despite the half core clock cycle between issuance of the second command 942 and issuance of the third command 946.

If the synchronization status 952 is received by the memory controller on the second half of the core clock cycle, data (e.g., the first data 950) received before the synchronization status 952 may be delayed by a half of the core clock cycle without delaying the data (e.g., the second data 954) received after the synchronization status 952. By determining which half of the core clock cycle 830 will result in the delay (e.g., an undesirable half 828 of the core clock cycle 830) the memory controller 602 may schedule commands to prevent gaps in data during a core clock alignment. Preventing gaps during the core clock alignment may improve the efficiency of the memory controller 602 and reduce memory latency.

Figure 10:
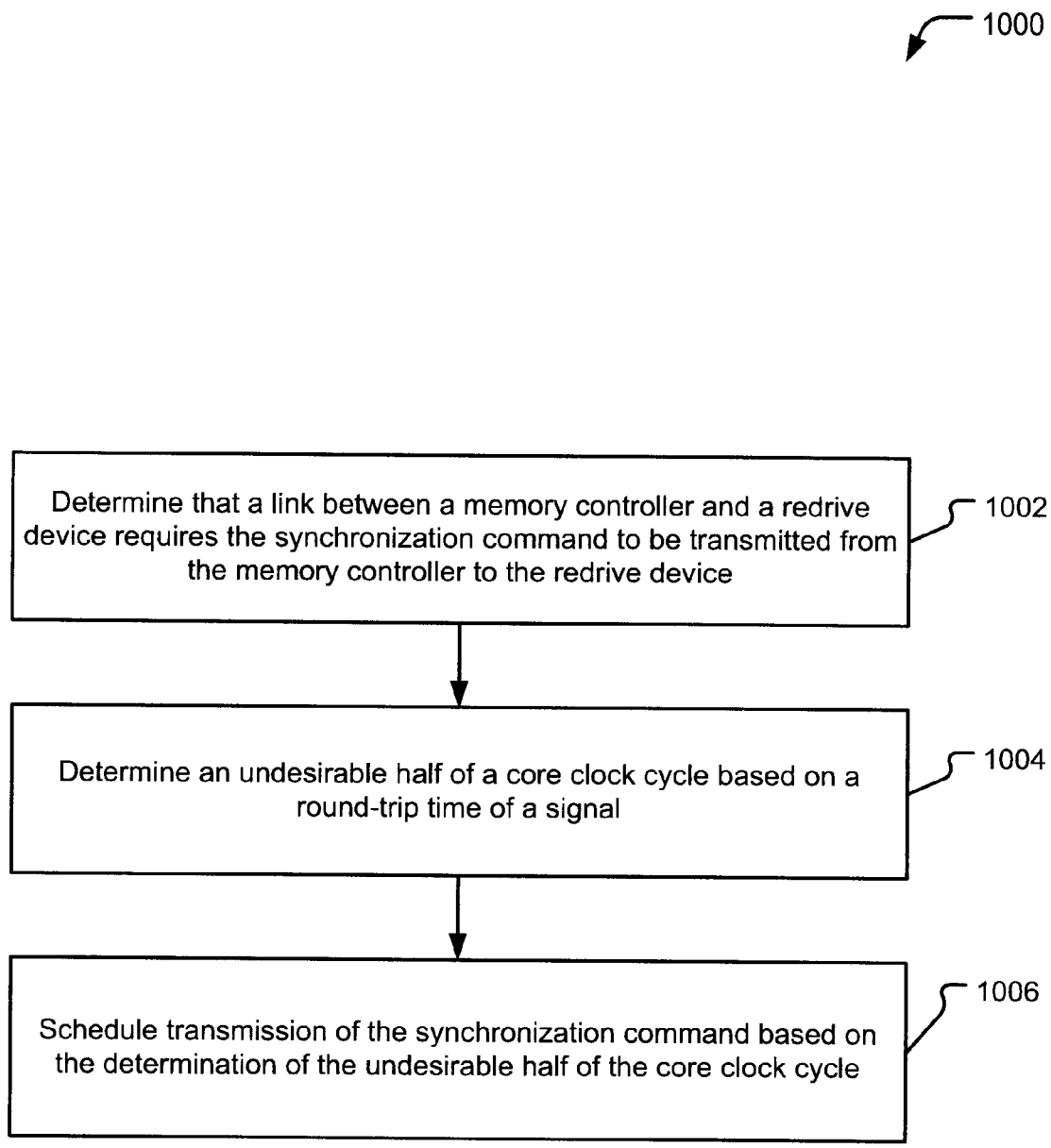
FIG. 10 is a flow diagram of third embodiment of a method to schedule commands at a memory controller.

FIG. 10 is a flow diagram of a third embodiment of a method 1000 to schedule commands at a memory controller. In a particular embodiment, the method 1000 is performed by any of the systems of FIGS. 6-9, or any combination thereof. The method 1000 includes determining that a link between a memory controller and a redrive device requires the synchronization command to be transmitted from the memory controller to the redrive device, at 1002. For instance, the memory controller 602 of FIG. 6 determines that the link 606 between the memory controller 602 and the redrive device 604 requires the synchronization command 608 to be transmitted from the memory controller 602 to the redrive device 604.

The method 1000 may also include determining an undesirable half of a core clock cycle based on a round-trip time of a signal, at block 1004. For example, the memory controller 602 of FIG. 6 determines the undesirable half (612 or 614) of the core clock 610 cycle based on the round-trip time 618 of the signal. As another example, the memory controller 602 of FIG. 7 determines the undesirable half 728 of the core clock cycle 730 based on the round-trip time 732. As another example, the memory controller 602 of FIG. 8 determines the undesirable half 826 of the core clock cycle 830 based on the round-trip time 832. The method 1000 further includes scheduling transmission of the synchronization command based on the determination of the undesirable half of the core clock cycle, at 1006. For instance, a memory controller may schedule transmission of the synchronization command 608 of FIG. 6 based on the determination of the undesirable half (612 or 614) of the core clock 610 cycle. As another example, scheduling of the transmission of the synchronization command 944 of FIG. 9 based on the determination of the undesirable half 964 of the core clock cycle.

Figure 11:
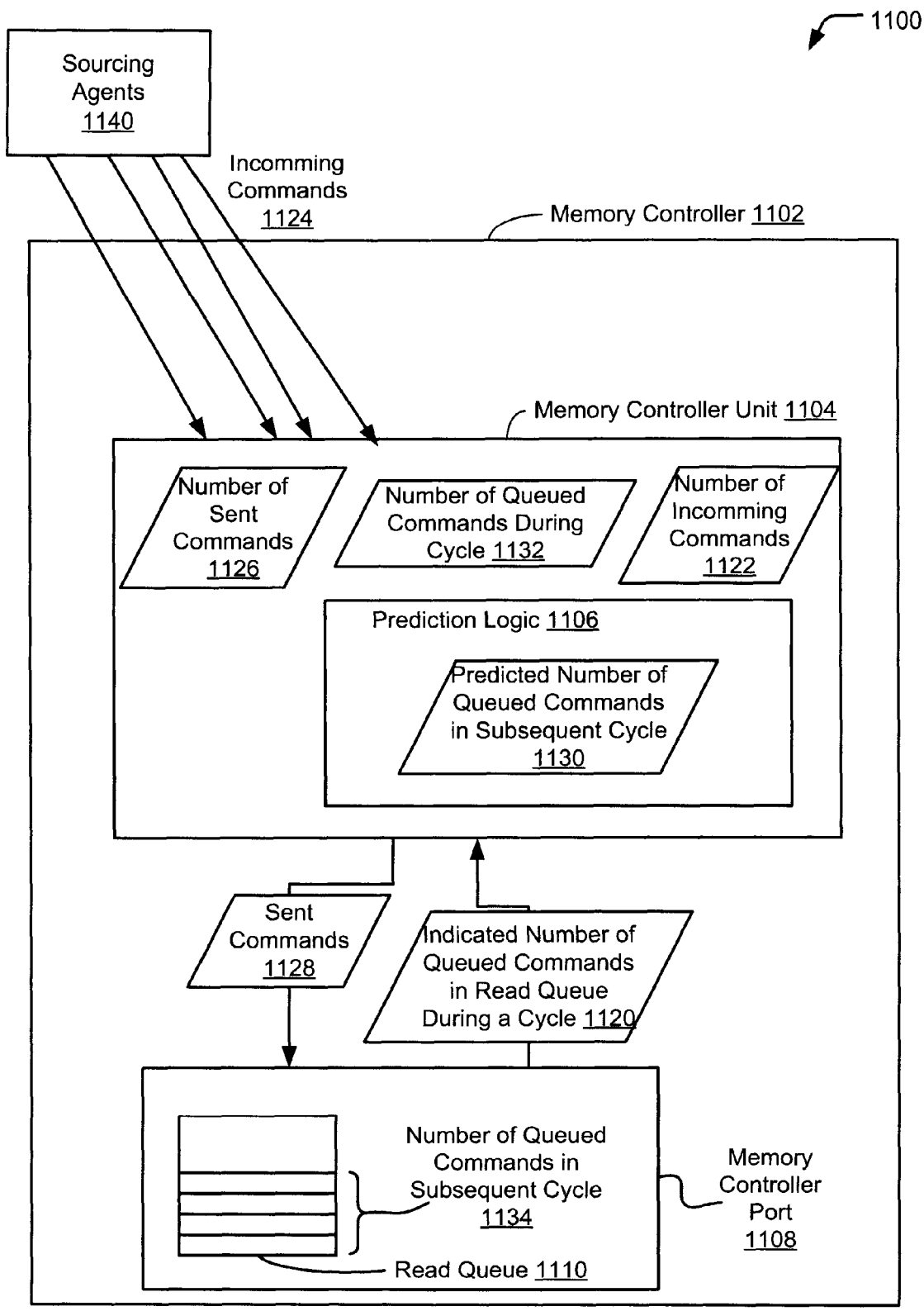
FIG. 11 is a block diagram of an eighth embodiment of a system to schedule commands at a memory controller.

FIG. 11 is a diagram of an eighth embodiment of a system to schedule commands at a memory controller and is generally designated 1100. The system 1100 includes a memory controller 1102 with a memory controller unit 1104 and a memory controller port 1108. The memory controller unit 1104 includes prediction logic 1106 and the memory controller port 1108 includes a read queue 1110.

The memory controller unit 1104 utilizes information gathered from multiple locations to predict the number of queued commands 1134 in the read queue 1110. Speculatively determining when the read queue 1110 is full allows the memory controller unit 1104 to provide efficient backpressure to sourcing agents 1140. Improving the accuracy of the predictions of a read queue status allows the memory controller 1102 to fill more of the read queue 1110. Filling more of the read queue 1110 improves utilization of the read queue 1110 and the overall efficiency of the memory controller 1102.

The memory controller 1102 is configured to receive from the memory controller port 1108 an indication 1120 of a number 1132 of queued commands in the read queue 1110 of the memory controller port 1108 during a cycle. The memory controller may be configured to track a number 1126 of sent commands 1128 transmitted to the memory controller port 1108. The memory controller 1102 may be configured to determine a predicted number 1130 of queued commands 1134 in the read queue during a subsequent cycle based on the number 1132 of queued commands in the cycle and the number 1126 of sent commands 1128.

The memory controller unit 1104 may transmit commands 1128 to the memory controller port 1108. The memory controller unit 1104 may track the number 1126 of the commands 1128 sent to the memory controller port 1108. The memory controller port 1108 determines the number 1132 of queued commands in the read queue during the cycle. The memory controller port 1108 may send to the memory controller unit 1104 the indication 1120 of the number 1132 of queued commands in the read queue during the cycle.

The memory controller unit 1104 may determine the predicted number 1130 of queued commands 1134 in the read queue during the subsequent cycle. The determination may be based on the number 1132 of queued commands during the cycle and the number 1126 of sent commands. The prediction logic 1106 of the memory controller unit 1104 may predict the number 1130 of queued commands 1134 in the read queue during the subsequent cycle. For example, the prediction logic 1106 may determine the predicted number 1130 of queued commands 1134 in the read queue during the subsequent cycle is ten when the number 1126 of sent commands is two and the number 1132 of queued commands in the read queue during the cycle is nine. In this case, the prediction logic 1106 predicted that one command was issued from the read queue 1110 between the cycle and the subsequent cycle.

The memory controller unit 1104 may determine whether to prevent subsequent commands from being directed to the memory controller port 1108. The determination may be based on the predicted number 1130 of queued commands in the read queue during the subsequent cycle and a maximum read queue capacity. The maximum read queue may be a maximum number of commands that the read queue 1110 can hold. For instance, the memory controller unit 1104 may prevent the subsequent commands from being directed to the memory controller port 1108 when the predicted number 1130 of queued commands in the read queue during the subsequent cycle is ten and the maximum read queue capacity is twelve.

The memory controller unit 1104 may receive incoming commands 1124 from the sourcing agents 1140. For example, the incoming commands 1124 may originate from a processor port, a scalability port, a request handler, or a pending queue. The memory controller may be able to ignore requests from some sourcing agents and have to take requests from other sourcing agents. For example, the memory controller may ignore fastpath requests. The memory controller unit 1104 may determine a number 1122 of the incoming commands 1124 received. The memory controller unit 1104 may apply backpressure to the sourcing agents 1140 based on the predicted number 1130 of queued commands in the read queue during the subsequent cycle and the number 1122 of incoming commands 1124. The backpressure may include signals that direct an individual sourcing agent to stop sending the incoming commands 1124. For instance, the memory controller unit 1104 may apply the backpressure to the sourcing agents 1140 when the predicted number 1130 of queued commands in the read queue during the subsequent cycle is ten and the number 1122 of incoming commands 1124 is five. Applying the backpressure to the sourcing agents 1140 prevents the read queue 1110 in the memory controller port 1108 from overfilling.

Speculatively determining when the read queue 1110 is full allows the memory controller unit 1104 to efficiently provide the backpressure to the sourcing agents 1140 and better predict the status of the read queue 1110. Improving the accuracy of predictions related to the status of the read queue 1110 may allow the memory controller 1102 to fill more of the read queue 1110. Filling more of the read queue 1110 improves the utilization of the read queue 1110 and increases the overall efficiency of the memory controller 1102.

Figure 12:
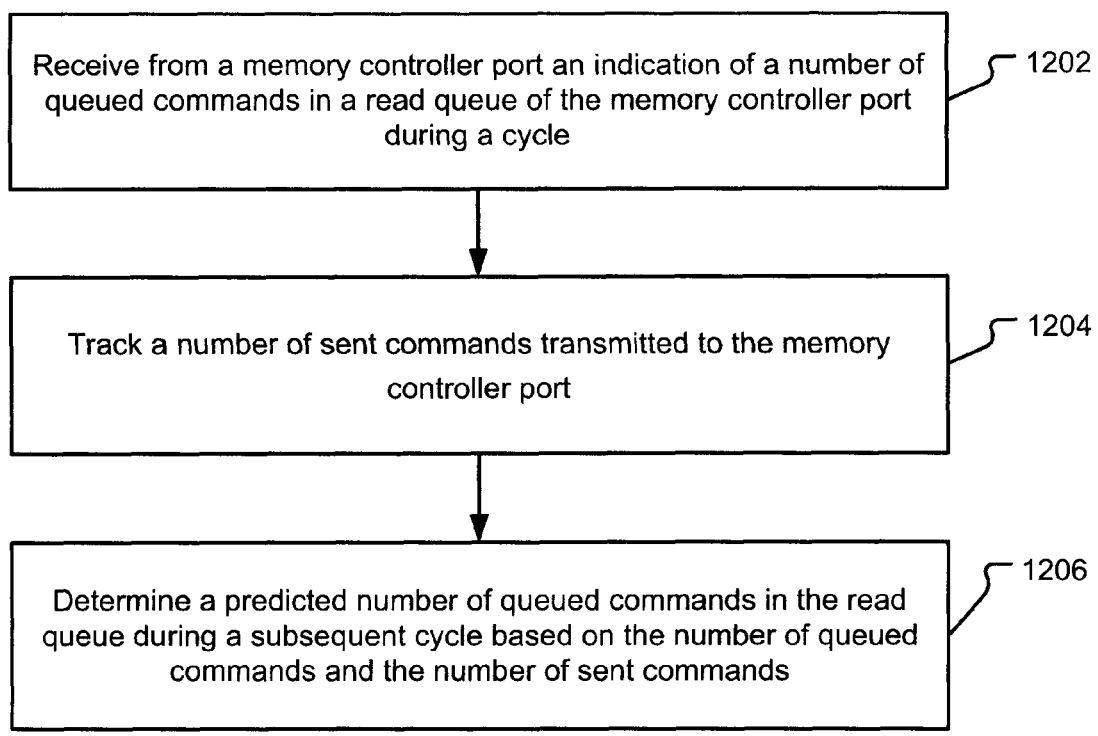
FIG. 12 is a flow diagram of a fourth embodiment of a method to schedule commands at a memory controller.

FIG. 12 is a flow diagram of fourth embodiment of a method 1200 to schedule commands at a memory controller. The method 1300 is performed by any of the systems of FIG. 11. The method includes receiving from a memory controller port an indication of a number of queued commands in the read queue of the memory controller port during a cycle, at block 1202. For example, the memory controller unit 1104 of FIG. 11 receives from the memory controller port 1108 the indication 1120 of the number 1132 of queued commands in the read queue 1110 during the cycle. The method 1200 also includes tracking a number of sent commands transmitted to the memory controller port, at block 1206. For instance, the memory controller unit 1104 of FIG. 11 tracks the number 1126 of the sent commands 1128. The method 1200 also includes determining a predicted number of queued commands in the read queue during a subsequent cycle based on the number of queued commands and the number of sent commands, at block 1208. For example, the prediction logic 1106 of the memory controller unit 1104 of FIG. 11 determines the predicted number 1130 of the queued commands 1134 in the read queue during a subsequent cycle based on the number 1132 of queued commands in the read queue during the cycle and the number 1126 of sent commands 1128.

Particular embodiments can take the form of an entirely hardware embodiment, an entirely software embodiment or an embodiment containing both hardware and software elements. In a particular embodiment, the disclosed methods are implemented in software, which includes but is not limited to firmware, resident software, microcode, etc.

Further, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disc-read only memory (CD-ROM), compact disc-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and features as defined by the following claims.

While the present invention has been illustrated by a description of various embodiments and while these embodiments have been described in considerable detail, it is not the intention of the Applicants to restrict, or any way limit the scope of the appended claims to such detail. The invention in its broader aspects is therefore not limited to the specific details, representative apparatus, method, and illustrative examples shown and described. Accordingly, departures may be made from such details without departing from the spirit or scope of Applicants' general inventive concept.

What is claimed is:

1. A method to schedule commands at a memory controller, the method comprising:
   determining that a first memory controller port of the memory controller initiated a first corrective action in response to detection of a transmission error associated with transmission of a first command between the first memory controller port and a first redrive device;
   determining that a second memory controller port of the memory controller initiated a second corrective action; and
   distributing an incoming read command, distinct from the first command, to one of the first memory controller port and the second memory controller port based on an anticipated order of completion of the first corrective action and the second corrective action determined by a comparison of the first corrective action and the second corrective action.

2. The method of claim 1, wherein the comparison determines order of initiation of the first corrective action and the second corrective action, wherein the incoming read command is distributed to the second memory controller port in response to the comparison indicating that the second corrective action was initiated before the first corrective action was initiated.

3. The method of claim 1, wherein the comparison determines order of severity of the first corrective action and the second corrective action, wherein severity is determined based on a number of clock cycles that occur during performance of a corrective action, and wherein the incoming read command is distributed to the first memory controller port in response to the comparison indicating that the second corrective action is more severe than the first corrective action.

4. The method of claim 3, wherein the first corrective action is a replay action and the second corrective action is a link retrain action that retrains a link between the second memory controller port and a second redrive device.

5. The method of claim 4, wherein the first command is transmitted within a first command stream, wherein the replay action includes reissuing the first command stream to a the first redrive device, and wherein the first command stream is reissued from a point where the first redrive device terminated the first command stream in response to the transmission error.

6. The method of claim 2, wherein the first corrective action is a first replay action and the second corrective action is a second replay action.

7. The method of claim 1, wherein the transmission error is detected by the first memory controller port upon receiving an alert status frame from the first redrive device.

8. The method of claim 1, wherein the transmission error is one of an uncorrectable error-correcting code and a cyclic redundancy check error.

9. A system to schedule commands at a memory controller, the system comprising:
   a memory controller that includes a first memory controller port and a second memory controller port;
   wherein the first memory controller port is configured to be coupled to a first redrive device and the second memory controller is configured to be coupled to a second redrive device, and
   wherein the memory controller is configured to determine that the first memory controller port initiated a first corrective action in response to detection of a transmission error associated with transmission of a first command from the first memory controller port to the first redrive device, to determine that the second memory controller port initiated a second corrective action, and to distribute an incoming read command, distinct from the first command, to one of the first memory controller port and the second memory controller port based on an anticipated order of completion of the first corrective action and the second corrective action determined by a comparison of the first corrective action and the second corrective action.

10. The system of claim 9, wherein the comparison determines an order of initiation of the first corrective action and the second corrective action, wherein the incoming read command is distributed to the second memory controller port in response to the comparison indicating that the second corrective action was initiated before the first corrective action was initiated, and wherein the first corrective action is a first replay action and the second corrective action is a second replay action.

11. The system of claim 9, wherein the comparison determines an order of severity of the first corrective action and the second corrective action, wherein severity is determined based on a number of clock cycles that occur during performance of a corrective action, and wherein the incoming read command is distributed to the first memory controller port in response to the comparison indicating that the second corrective action is more severe than the first corrective action.

12. The system of claim 11, wherein the first corrective action is a replay action and the second corrective action is a link retrain action that retrains a link between the second memory controller port and the second redrive device.

13. The system of claim 12, wherein the first command is transmitted within a first command stream, wherein the replay action includes reissuing the first command stream to the first redrive device, and wherein the first command stream is reissued from a point that the first redrive device terminated the first command stream in response to the transmission error of the first command stream.

14. The system of claim 9, wherein the transmission error is one of an uncorrectable error-correcting code and a cyclic redundancy check error.

15. A non-transitory computer-readable medium having instructions executable by a memory controller to:
   determine that a first memory controller port of the memory controller initiated a first corrective action in response to detection of a transmission error associated with transmission of a first command from the first memory controller port to a first redrive device;
   determine that a second memory controller port of the memory controller initiated a second corrective action; and
   distribute an incoming read command, distinct from the first command, to one of the first memory controller port and the second memory controller port based on an anticipated order of completion of the first corrective action and the second corrective action determined by a comparison of the first corrective action and the second corrective action.

16. The non-transitory computer-readable medium of claim 15, wherein the comparison determines an order of initiation of the first corrective action and the second corrective action, wherein the incoming read command is distributed to the second memory controller port in response to the comparison indicating that the second corrective action was initiated before the first corrective action was initiated, and wherein the first corrective action is a first replay action and the second corrective action is a second replay action.

17. The non-transitory computer-readable medium of claim 15, wherein the comparison determines an order of severity of the first corrective action and the second corrective action, wherein severity is determined based on a number of clock cycles that occur during performance of a corrective action, and wherein the incoming read command is distributed to the first memory controller port in response to the comparison indicating that the second corrective action is more severe than the first corrective action.

18. The non-transitory computer-readable medium of claim 17, wherein the first corrective action is a replay action and the second corrective action is a link retrain action that retrains a link between the second memory controller port and a second redrive device.

19. The non-transitory computer-readable medium of claim 18, wherein the first command is transmitted within a first command stream, wherein the replay action includes reissuing the first command stream to the first redrive device, wherein the first command stream is reissued from a point that the first redrive device terminated the first command stream in response to the transmission error of the first command stream.

20. The non-transitory computer-readable medium of claim 15, wherein the transmission error is one of an uncorrectable error-correcting code and a cyclic redundancy check error.

* * * * *